United States Patent
Kuo et al.

(10) Patent No.: US 11,928,456 B2
(45) Date of Patent: Mar. 12, 2024

(54) SOFTWARE UPGRADE SYSTEM, SOFTWARE UPGRADE METHOD AND NON-TRANSITORY RECORDING MEDIUM

(71) Applicant: ADLINK TECHNOLOGY INC., Taoyuan (TW)

(72) Inventors: Chen-Ying Kuo, Taoyuan (TW); Cheng-Ting Chang, Taoyuan (TW); Yi-Chen Liu, Taoyuan (TW)

(73) Assignee: ADLINK TECHNOLOGY INC., Taoyuan (TW)

( * ) Notice: Subject to any disclaimer, the term of this patent is extended or adjusted under 35 U.S.C. 154(b) by 125 days.

(21) Appl. No.: 17/695,849

(22) Filed: Mar. 16, 2022

(65) Prior Publication Data
US 2023/0214204 A1 Jul. 6, 2023

(30) Foreign Application Priority Data
Dec. 30, 2021 (TW) ................ 110149650

(51) Int. Cl.
*G06F 9/44* (2018.01)
*G06F 8/61* (2018.01)
*G06F 8/65* (2018.01)

(52) U.S. Cl.
CPC . *G06F 8/65* (2013.01); *G06F 8/61* (2013.01)

(58) Field of Classification Search
CPC ........................................... G06F 8/65
USPC .......................................... 717/168
See application file for complete search history.

(56) References Cited

U.S. PATENT DOCUMENTS

| 9,294,340 B1 * | 3/2016 | Logue ............ G06F 16/258 |
| 11,604,443 B2 * | 3/2023 | Hannon ............ G05B 19/0421 |
| 2020/0167631 A1 * | 5/2020 | Rezgui ............ B25J 9/0084 |

FOREIGN PATENT DOCUMENTS

| CN | 113326053 A | * | 8/2021 |
| CN | 113986278 A | * | 1/2022 |

* cited by examiner

*Primary Examiner* — Evral E Bodden

(57) ABSTRACT

The present disclosure provides a software upgrade system, which is applicable to at least one autonomous mobile robot installed with software in a data distribution service domain. The at least one autonomous mobile robot publishes a version information about the software to the version synchronization topic and receives other version information from the version synchronization topic. Also, the at least one autonomous mobile robot subscribes to a version synchronization topic, and takes the software of the at least one autonomous mobile robot itself as the latest version by a software update procedure to upload to a software update topic, or downloads the latest version of the software from the software update topic and installs it. The present disclosure provides a software upgrade method and a non-transitory recording medium.

2 Claims, 6 Drawing Sheets

SOFTWARE UPGRADE SYSTEM, SOFTWARE UPGRADE METHOD AND NON-TRANSITORY RECORDING MEDIUM

CROSS-REFERENCE TO RELATED APPLICATION

This non-provisional application claims priority under 35 U.S.C. § 119(a) on Patent Application No(s). 110149650 filed in Taiwan, R.O.C. on Dec. 30, 2021, the entire contents of which are hereby incorporated by reference.

BACKGROUND OF THE INVENTION

1. Field of the Invention

The present disclosure provides a software upgrade technology, especially a software upgrade system, software upgrade method and non-transitory recording medium that are decentralized, and do not require a central control server.

2. Description of the Related Art

Autonomous Mobile Robots (AMRs) are becoming increasingly popular in vertical markets such as logistics, healthcare, agriculture and mining. In addition, as labor costs increase, the development and introduction of robotic systems will be further emphasized in the future to perform repetitive work.

In a workplace, multiple autonomous mobile robots are often set up, which are connected to each other via a network and controlled by a central control server to complete tasks. Each autonomous mobile robot must be installed with the latest software, and the current method is to upgrade the software of each autonomous mobile robot by the central control server.

BRIEF SUMMARY OF THE INVENTION

The inventor exhausted his mind to research carefully, and then developed a software upgrade system, a software upgrade method and a non-transitory recording medium, in order to achieve decentralization, and do not require a central control server for the purpose of software upgrade.

The first aspect of the present disclosure provides a software upgrade system, which is applicable to at least one autonomous mobile robot installed with software in a data distribution service domain, the software upgrade system is associated with the data distribution service domain and comprises a version synchronization topic and a software update topic. The at least one autonomous mobile robot comprises a version synchronization topic publisher, a version synchronization topic subscriber, a software update module, a software update topic publisher and a software update topic subscriber. The version synchronization topic publisher is used to publish a version information about the software to the version synchronization topic. The version synchronization topic subscriber is used to receive other version information from the version synchronization topic. The software update module is used to subscribe to the version synchronization topic, when detecting that the version information of the at least one autonomous mobile robot itself is inconsistent with the version information of the version synchronization topic, a software update procedure is started. The software update topic publisher is used to upload the software to the software update topic when starting the software update procedure and determining that the version information of the software of the at least one autonomous mobile robot itself is the latest version compared to the other version information. The software update topic subscriber is used to download the latest version of the software from the software update topic and install in the at least one autonomous mobile robot when starting the software update procedure and determining that the version information of the software of the at least one autonomous mobile robot itself is not the latest version compared to the other version information.

The second aspect of the present disclosure provides a software upgrade method, which is applicable to at least one autonomous mobile robot installed with software in a data distribution service domain, the software upgrade method comprising the following steps: allowing the at least one autonomous mobile robot to publish version information about the software in the data distribution service domain to a version synchronization topic, and receiving other version information from the version synchronization topic; subscribing to the version synchronization topic by a software update module of the at least one autonomous mobile robot, when detecting that the version information of the at least one autonomous mobile robot itself is inconsistent with the version information of the version synchronization topic, a software update procedure is started; when starting the software update procedure and determining that the version information of the software of the at least one autonomous mobile robot itself is the latest version compared to the other version information by a software update topic publisher of the at least one autonomous mobile robot, uploading the software to a software update topic; and when determining that the version information of the software of the at least one autonomous mobile robot itself is not the latest version by the software update topic subscriber, downloading the latest version of the software from the software update topic and installing in the at least one autonomous mobile robot.

The third aspect of the present disclosure provides a non-transitory recording medium, which stores a plurality of program instructions, so that after the at least one autonomous mobile robot installed with the software in the data distribution service domain executes the program instructions, the following steps can be executed: allowing the at least one autonomous mobile robot to publish version information about the software in the data distribution service domain to a version synchronization topic, and receiving other version information from the version synchronization topic; subscribing to the version synchronization topic by the software update module of the at least one autonomous mobile robot, when detecting that the version information of the at least one autonomous mobile robot itself is inconsistent with the version information of the version synchronization topic, a software update procedure is started; when starting the software update procedure and determining that the version information of the software of the at least one autonomous mobile robot itself is the latest version compared to the other version information by a software update topic publisher of the at least one autonomous mobile robot, uploading the software to a software update topic; and when determining that the version information of the software of the at least one autonomous mobile robot itself is not the latest version by a software update topic subscriber of the at least one autonomous mobile robot, downloading the latest version of the software from the software update topic and installing in the at least one autonomous mobile robot.

In an embodiment, the version information comprises an identification number and software information of the at least one autonomous mobile robot.

In an embodiment, when starting the software update procedure, if it is found that the software version of the at least one autonomous mobile robot itself and any of software versions of the other version information are the latest version, it is selected whether to take the software of the at least one autonomous mobile robot itself as the latest version and uploaded to the software update topic according to the identification number sequence of the at least one autonomous mobile robot.

By means of a software upgrade system, software upgrade method and non-transitory recording medium of the present disclosure, a plurality of autonomous mobile robots may subscribe to the version synchronization topic and the software update topic through the data distribution service domain, in order to synchronously update the software to the latest version, thereby achieving decentralization, without the need for a central control server to perform the purpose of software upgrade. In addition, connecting any autonomous mobile robot in the data distribution service domain to other data distribution service domains also enables the software of all autonomous mobile robots in the other data distribution service domains to be upgraded to the latest version.

DETAILED DESCRIPTION OF THE INVENTION

Figure 1:
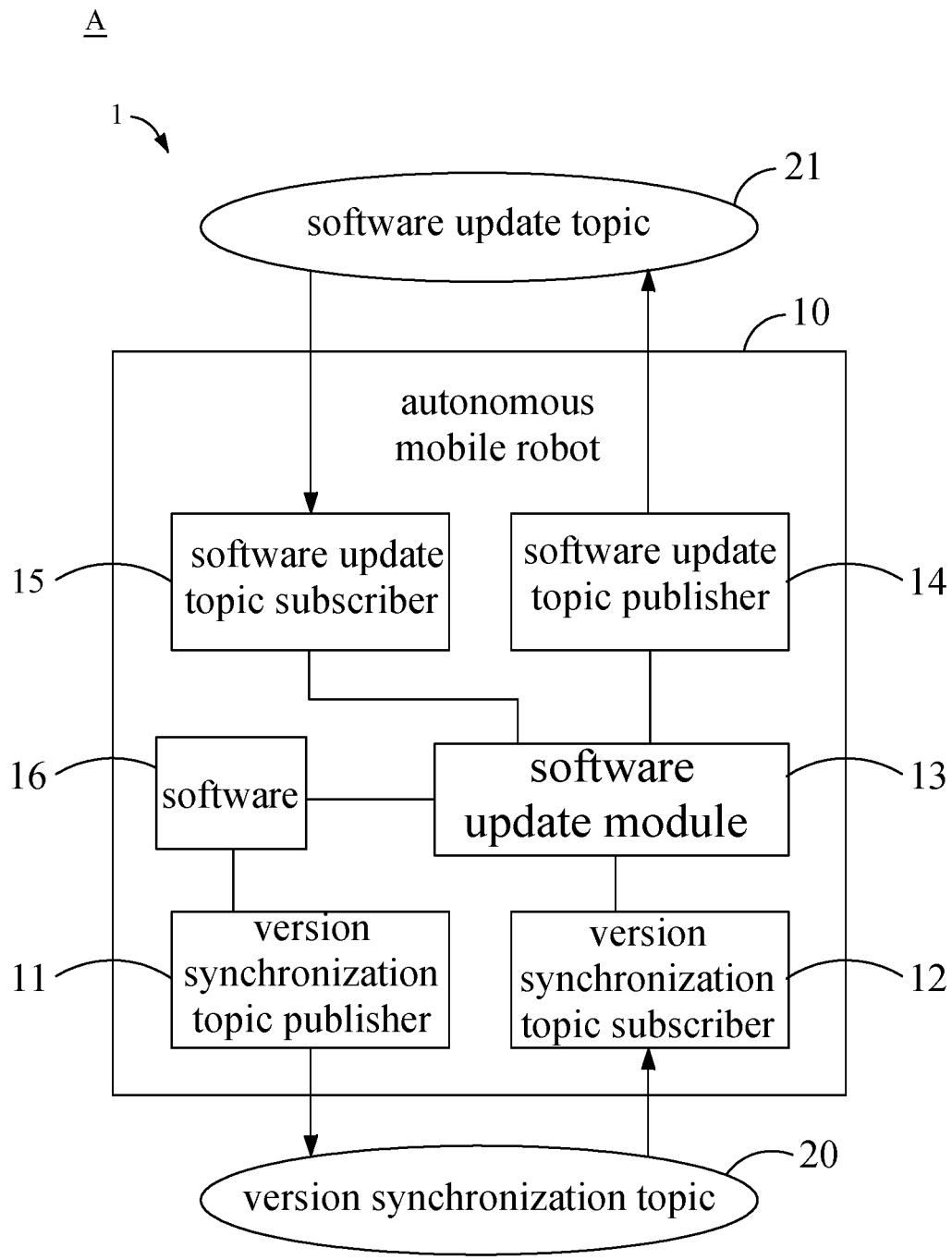
FIG. 1 is a schematic block diagram of a software upgrade system according to an embodiment of the present disclosure.

To facilitate understanding of the object, characteristics and effects of this present disclosure, embodiments together with the attached drawings for the detailed description of the present disclosure are provided. The description is provided as follows:

Referring to FIG. 1, the first aspect of the present disclosure provides a software upgrade system 1, which is applicable to at least one autonomous mobile robot (AMR) 10 installed with software 16 in a data distribution service (DDS) domain A, the software upgrade system 1 is associated with the data distribution service domain A and comprises a version synchronization topic 20 and a software update topic 21. The at least one autonomous mobile robot 10 comprises a version synchronization topic publisher 11, a version synchronization topic subscriber 12, a software update module 13, a software update topic publisher 14 and a software update topic subscriber 15. The version synchronization topic publisher 11 is used to publish a version information about the software 16 to the version synchronization topic 20. The version synchronization topic subscriber 12 is used to receive other version information from the version synchronization topic 20. The software update module 13 is used to subscribe to the version synchronization topic 20, when detecting that the version information of the at least one autonomous mobile robot 10 itself is inconsistent with the version information of the version synchronization topic 20, a software update procedure is started. The software update topic publisher 14 is used to upload the software 16 to the software update topic 21 when starting the software update procedure and determining that the version information of the software of the at least one autonomous mobile robot 10 itself is the latest version compared to the other version information. The software update topic subscriber 15 is used to download the latest version of the software 16 from the software update topic 21 and install in the at least one autonomous mobile robot 10 when starting the software update procedure and determining that the version information of the software 16 of the at least one autonomous mobile robot 10 itself is not the latest version compared to the other version information.

The software upgrade system 1 of the present disclosure may be applied to a plurality of autonomous mobile robots 10. The autonomous mobile robot 10 may be located at each node of the data distribution service domain A, each autonomous mobile robot 10 is both a publisher and a subscriber, can communicate with each other through a peer-to-peer manner, and logically has no master-slave relationship with each other. The software 16 installed in the autonomous mobile robot 10 may be software to control the respective autonomous mobile robot to perform laser, camera, navigation and built-in sensors and other related functions.

Figure 2:
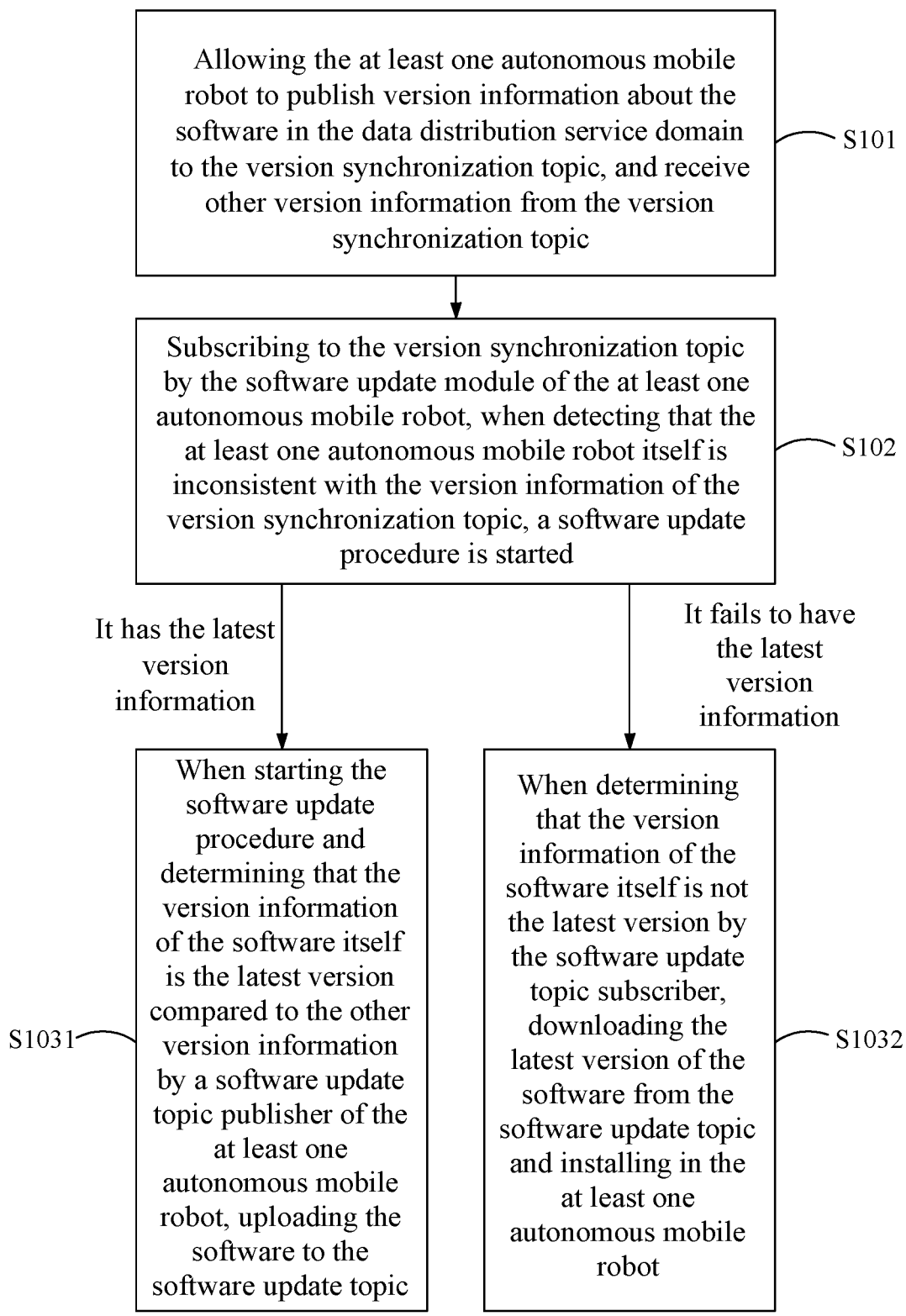
FIG. 2 is a schematic flow chart of a software upgrade method according to the embodiment of the present disclosure.

Referring to FIGS. 1 and 2, the second aspect of the present disclosure provides a software upgrade method, which is applicable to the autonomous mobile robot 10 in the data distribution service domain A, the software upgrade method comprises the following steps:

Step S101: allowing the at least one autonomous mobile robot 10 to publish version information about the software 16 in the data distribution service domain A to the version synchronization topic 20, and receiving other version information from the version synchronization topic 20.

Step S102: subscribing to the version synchronization topic 20 by a software update module 13 of the at least one autonomous mobile robot 10, when detecting that the version information of the at least one autonomous mobile robot 10 itself is inconsistent with the version information of the version synchronization topic 20, a software update procedure is started.

S1031: when starting the software update procedure and determining that the version information of the software of the at least one autonomous mobile robot itself is the latest version compared to the other version information by the software update topic publisher 14 of the at least one autonomous mobile robot 10, uploading the software 16 to the software update topic 21.

S1032: when determining that the version information of the software 16 of the at least one autonomous mobile robot itself is not the latest version by the software update topic subscriber 15, downloading the latest version of the software 16 from the software update topic 21 and installing in the at least one autonomous mobile robot 10.

The third aspect of the present disclosure provides a non-transitory recording medium, which stores a plurality of program instructions, so that after the at least one autonomous mobile robot 10 installed with the software in the data distribution service domain A executes the program instructions, the steps as shown in FIG. 2 can be executed. The non-transitory recording medium may be a disc, memory card, portable hard drive, or other computer-readable device.

As mentioned above, by means of the software upgrade system 1, the software upgrade method and the non-transitory recording medium of the present disclosure, a plurality of autonomous mobile robots 10 may subscribe to the version synchronization topic 20 and the software update topic 21 through the data distribution service domain A to synchronously upgrade the software 16 to the latest version, so as to achieve decentralization, without the need for a central control server to perform the purpose of software upgrade. Further, after any of the autonomous mobile robots 10 in the data distribution service domain A is connected to other data distribution service domains, the software of all autonomous mobile robots in other data distribution service domains can also be upgraded to the latest version.

As shown in FIG. 1, the software upgrade system 1 may be software, and the version synchronization topic publisher 11, the version synchronization topic subscriber 12, the software update module 13, the software update topic publisher 14 and the software update topic subscriber 15 may be program instructions in the software.

Figure 3:
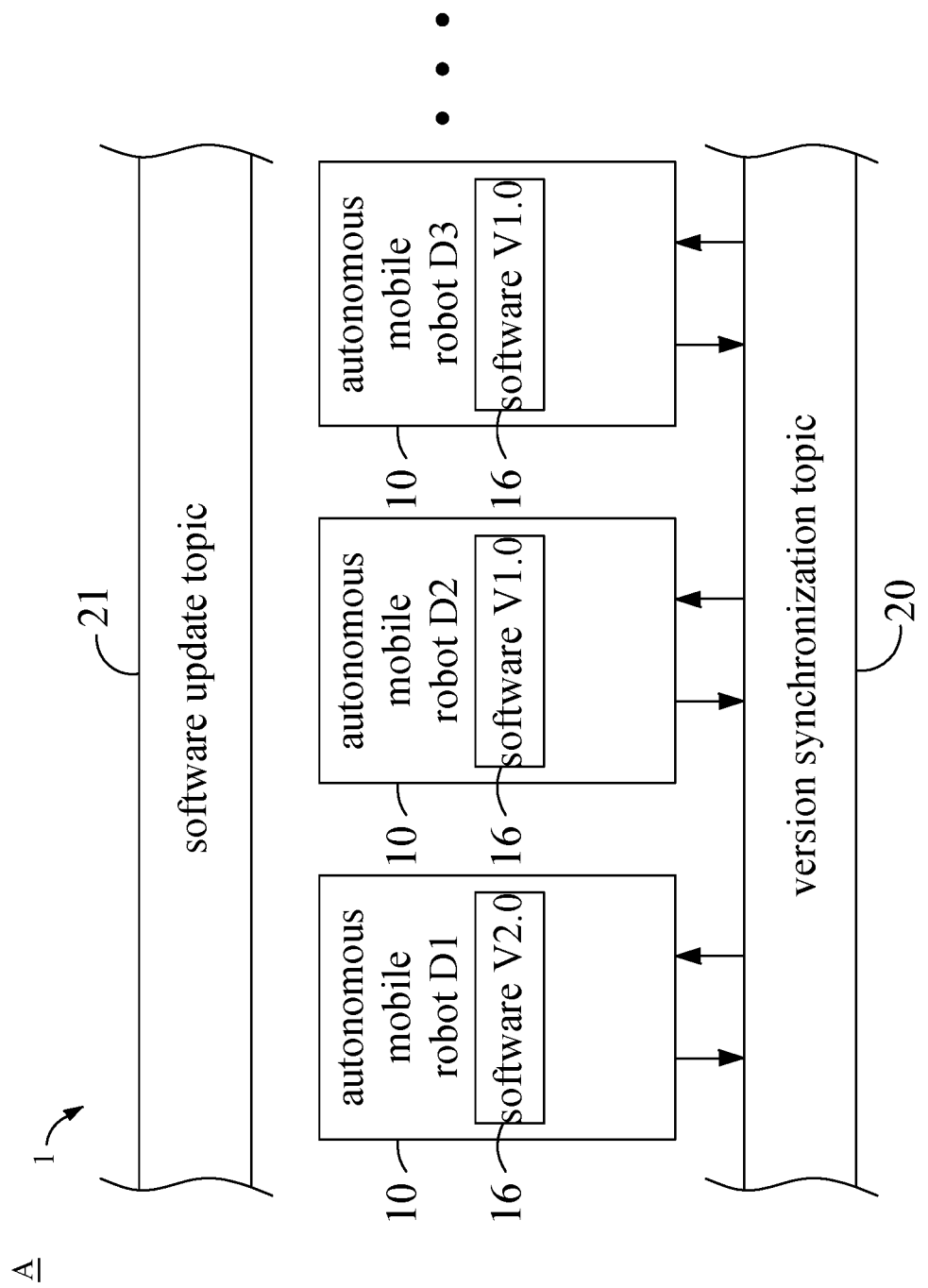
FIG. 3 is a schematic view 1 of a plurality of autonomous mobile robots of the software upgrade system performing a version synchronization check according to the embodiment of the present disclosure.
Figure 4:
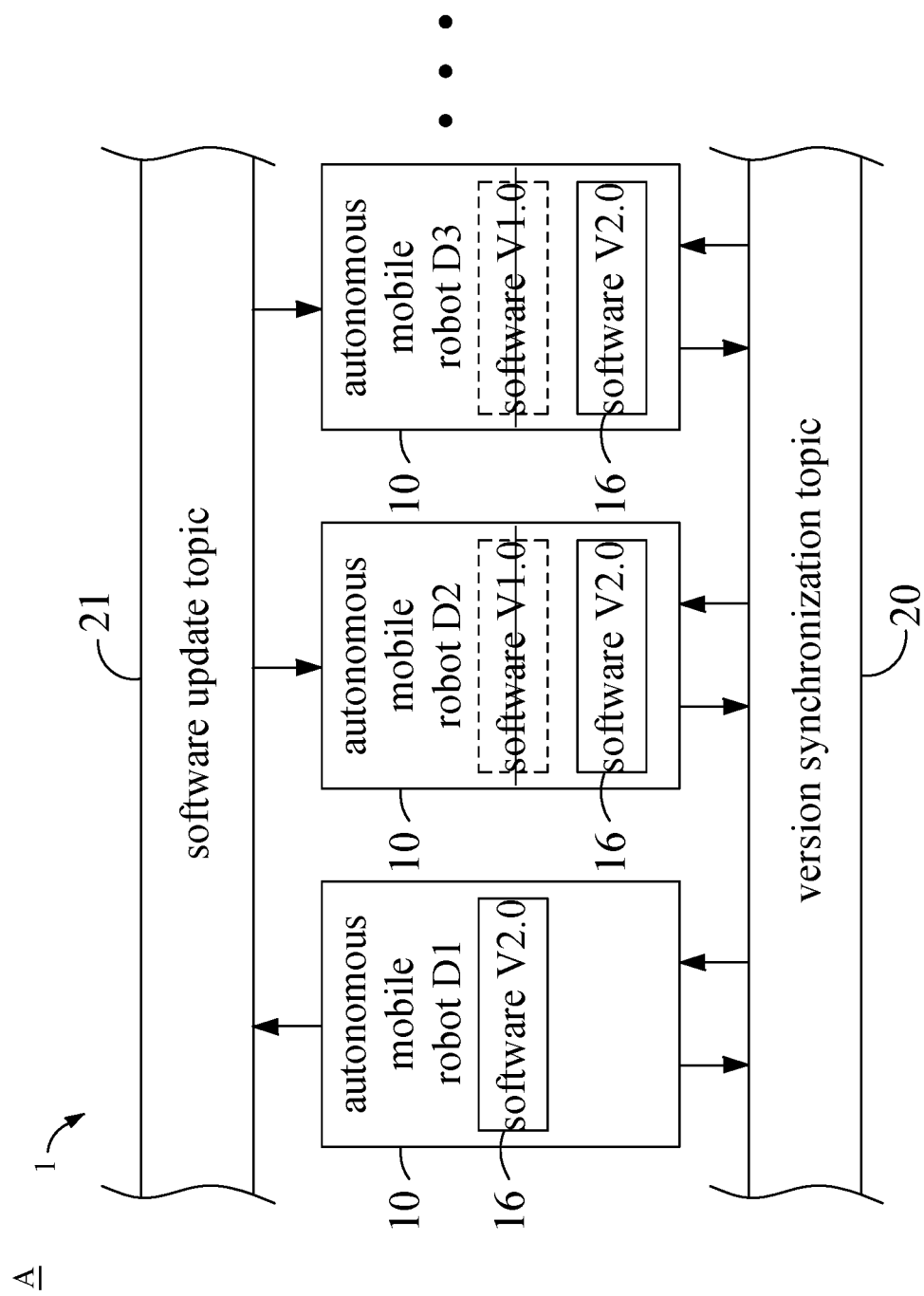
FIG. 4 is a schematic view 1 of a plurality of autonomous mobile robots performing software upgrade continued on FIG. 3.

As shown in FIG. 1 and FIGS. 3 to 4, each node of the data distribution service domain A can be respectively equipped with the above-mentioned autonomous mobile robot 10. Each autonomous mobile robot 10 publishes version information about the software 16 to the version synchronization topic 20, and receives other version information from the version synchronization topic 20 (the version information uploaded by other autonomous mobile robots 10). The version information comprises an identification number and software information. In FIG. 3, both the autonomous mobile robots 10 with the identification number D2 and the identification number D3 publish software information of the software 16 that is version V1.0, however, the identification number D1 of the autonomous mobile robot 10 publishes software information that is the software 16 of version V2.0. In FIG. 4, at this time because it is found there is a different version, each autonomous mobile robot 10 starts the aforementioned software update procedure, after determining that version V2.0 is the latest version, the autonomous mobile robot 10 that publishes version V2.0 and has the identification number D1 uploads version 2.0 of the software 16 to the software update topic 21, as for the autonomous mobile robots 10 that publish the other original version V1.0 and have the identification number D2, D3, etc., they download version V2.0 of the software 16 from the software update topic 21 and install it.

Figure 5:
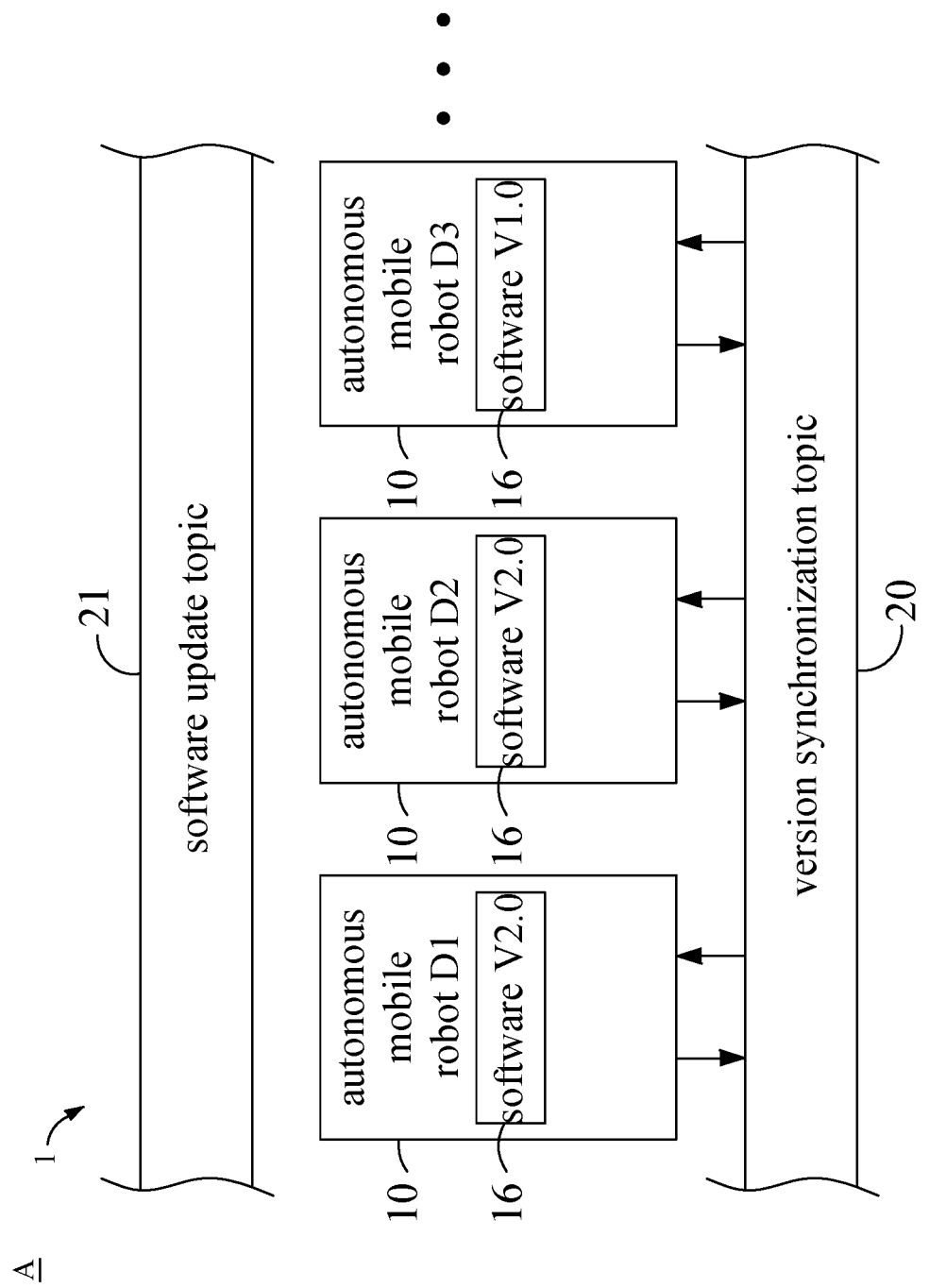
FIG. 5 is a schematic view 2 of a plurality of autonomous mobile robots of the software upgrade system performing a version synchronization check according to the embodiment of the present disclosure.
Figure 6:
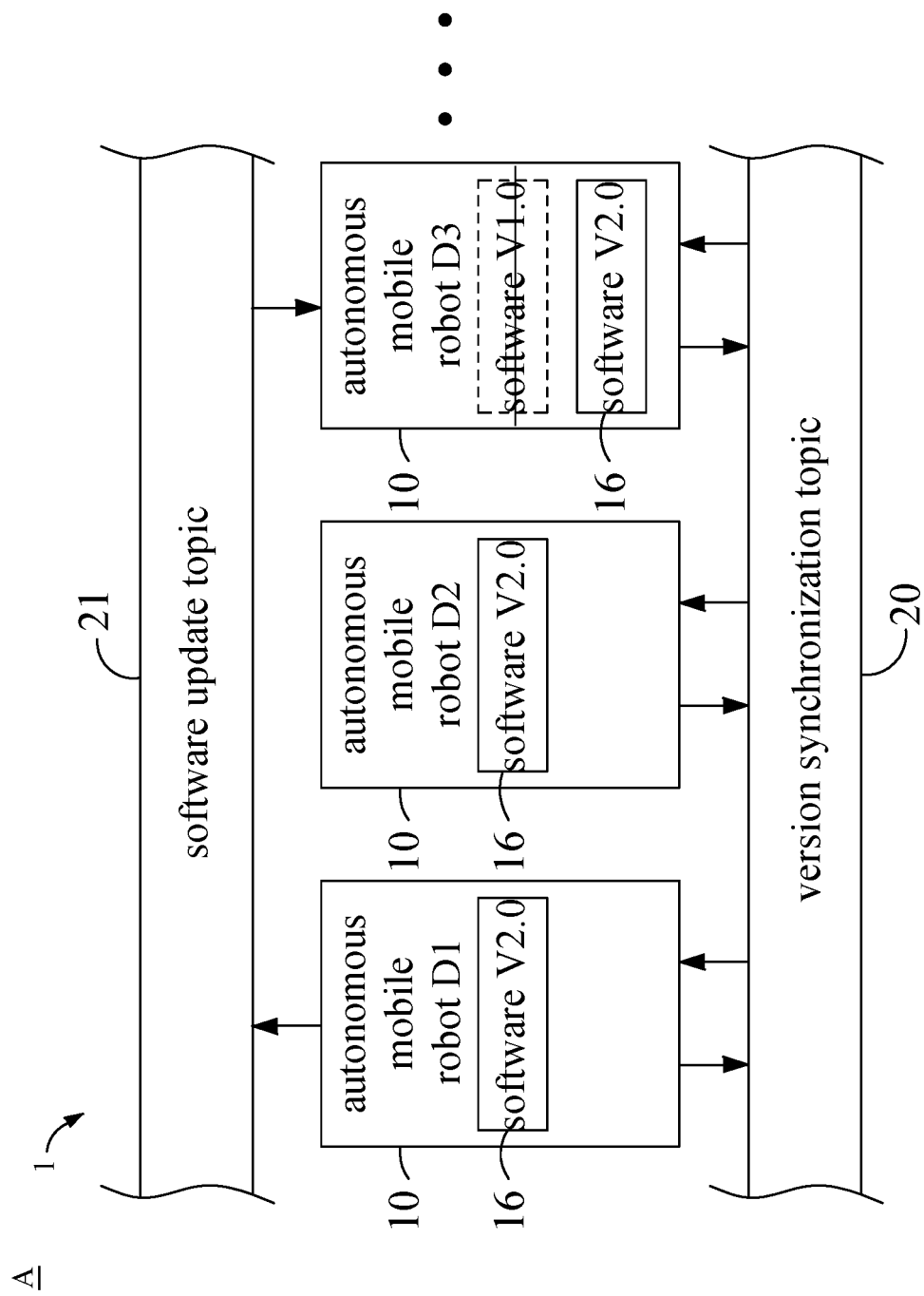
FIG. 6 is a schematic view 2 of a plurality of autonomous mobile robots performing software upgrade continued on FIG. 5.

As shown in FIG. 1 and FIGS. 5 to 6, in an embodiment, when starting the software update procedure, if it is found that there is more than one autonomous mobile robot 10 with software information of the software 16 that is the latest version in the data distribution service domain A, it may be selected whether to take the software 16 of the autonomous mobile robot itself as the latest version and uploaded to the software update topic 21 according to the identification number sequence of the autonomous mobile robots 10. For example, the autonomous mobile robot with a prior identification number takes the software 16 of the autonomous mobile robot itself as the latest version and uploaded to the software update topic 21, the other autonomous mobile robots 10 that fail to have the latest version download the latest version of the software 16 from the software update topic 21 and install it. For example, in FIG. 5, both the autonomous mobile robots 10 of the identification number D1 and the identification number D2 publish software information of the software 16 that is version V2.0 to the version synchronization topic 20, and after determining by the above rule, in FIG. 6, the autonomous mobile robot 10 with the identification number D1 uploads version 2.0 of the software 16 to the software update topic 21. In addition to the autonomous mobile robot 10 that is also the identification number D2 of version 2.0, other autonomous mobile robots 10, such as the autonomous mobile robot 10 of the identification number D3 of version 1.0, download version V2.0 of the software 16 from the software update topic 21 and install it. The above examples are included but not limited to herein, as long as there are rules provided for the autonomous mobile robot 10 at each node of the data distribution service domain A to follow, and the software 16 can be quickly synchronized.

While the present disclosure has been described by means of specific embodiments, those skilled in the art should understand the above description is merely embodiments of the disclosure, and it should not be considered to limit the scope of the disclosure. It should be noted that all changes and substitutions which come within the meaning and range of equivalency of the embodiments are intended to be embraced in the scope of the disclosure. Therefore, the scope of the disclosure is defined by the claims.

What is claimed is:

1. A software upgrade method, which is applicable to at least one autonomous mobile robot installed with software in a data distribution service domain, the software upgrade method comprising the following steps:
   allowing the at least one autonomous mobile robot to publish a first version information about the software in the data distribution service domain to a version synchronization topic, and receiving a second version information from the version synchronization topic;
   subscribing to the version synchronization topic by a software update module of the at least one autonomous mobile robot, when detecting that the at least one autonomous mobile robot itself is inconsistent with the second version information of the version synchronization topic, a software update procedure is started;
   when starting the software update procedure and determining that the first version information of the software of the at least one autonomous mobile robot itself is the latest version compared to the second version information by a software update topic publisher of the at least one autonomous mobile robot, uploading the software to a software update topic; and
   when determining that the first version information of the software of the at least one autonomous mobile robot itself is not the latest version by the software update topic subscriber, downloading the latest version of the software from the software update topic and installing it in the at least one autonomous mobile robot,
   wherein the first version information and the second version information comprise an identification number and a software version of the at least one autonomous mobile robot, respectively, and
   wherein when starting the software update procedure, if it is determined that the software version of the at least one autonomous mobile robot itself and any of software versions of the second version information are the latest version, it is determined whether to take the software of the at least one autonomous mobile robot itself as the latest version and uploaded to the software update topic according to the sequence of the identification number of the at least one autonomous mobile robot.

2. A non-transitory recording medium, which stores a plurality of program instructions, so that after an autonomous mobile robot installed with software in the data distribution service domain having a software synchronization topic executes the program instructions, the following steps can be executed:

allowing the at least one autonomous mobile robot to publish a first version information about the software in the data distribution service domain to a version synchronization topic, and receiving a second version information from the version synchronization topic;

subscribing to the version synchronization topic by a software update module of the at least one autonomous mobile robot, when detecting that the first version information of at least one autonomous mobile robot itself is inconsistent with the second version information of the version synchronization topic, a software update procedure is started;

when starting the software update procedure and determining that the first version information of the software of the at least one autonomous mobile robot itself is the latest version compared to the second version information by a software update topic publisher of the at least one autonomous mobile robot, uploading the software to a software update topic; and when determining that the first version information of the software of the at least one autonomous mobile robot itself is not the latest version by a software update topic subscriber of the at least one autonomous mobile robot, downloading the latest version of the software from the software update topic and installing it in the at least one autonomous mobile robot, wherein the first version information and the second version information comprise an identification number and a software version of the at least one autonomous mobile robot, respectively, and wherein when starting the software update procedure, if it is determined that the software version of the at least one autonomous mobile robot itself and any of software versions of the second version information are the latest version, it is determined whether to take the software of the at least one autonomous mobile robot itself as the latest version and uploaded to the software update topic according to the sequence of the identification number of the at least one autonomous mobile robot.

* * * * *